United States Patent [19]

Arakawa et al.

[11] 3,849,087
[45] Nov. 19, 1974

[54] PROCESS FOR PRODUCING GASES BY THE CONVERSION OF HYDROCARBONS

[75] Inventors: Tetsutaro Arakawa, Tokyo; Michio Oka, Yokohama, both of Japan

[73] Assignee: Mitsubishi Chemical Industries Ltd., Tokyo, Japan

[22] Filed: Feb. 15, 1973

[21] Appl. No.: 332,837

[52] U.S. Cl.............. 48/214, 48/213, 252/458, 252/459, 252/470, 252/373
[51] Int. Cl............................................ C01b 2/16
[58] Field of Search ...... 48/214, 215, 213; 252/458, 252/461, 463, 470, 459, 373

[56] References Cited
UNITED STATES PATENTS

| | | | |
|---|---|---|---|
| 3,415,634 | 12/1968 | Dent et al. | 48/215 X |
| 3,421,871 | 1/1969 | Davies | 48/214 |
| 3,432,443 | 3/1969 | Davies et al. | 48/214 X |
| 3,444,099 | 5/1969 | Taylor et al. | 48/214 X |

Primary Examiner—R. E. Serwin
Attorney, Agent, or Firm—Sughrue, Rothwell, Mion, Zinn & Macpeak

[57] ABSTRACT

A synthesis gas mainly consisting of hydrogen and carbon monoxide or a methane-rich town gas is produced without significant deposition of carbon by the conversion of hydrocarbons with steam and/or carbon dioxide in the presence of a nickel-vanadium or nickel-molybdenum catalyst supported on a heat-resistant carrier.

29 Claims, 2 Drawing Figures

PROCESS FOR PRODUCING GASES BY THE CONVERSION OF HYDROCARBONS

BACKGROUND OF THE INVENTION

1. Field of the Invention.

The present invention relates to a process for the conversion of hydrocarbons by catalytically reacting the hydrocarbons and steam and/or carbon dioxide in the presence of a novel catalyst. More particularly, the present invention relates to a process for producing a synthesis gas mainly consisting of hydrogen and carbon monoxide or a town gas enriched with methane by catalytically reacting hydrocarbons and steam and/or carbon dioxide in the presence of an improved nickel-type catalyst having the excellent effect of suppressing the deposition of carbon.

2. Description of the Prior Art.

Methods of converting hydrocarbons into a mixed gas mainly consisting of hydrogen and carbon monoxide or a mixed gas enriched with methane by a catalytic cracking or reaction of the hydrocarbons with steam or carbon dioxide on a catalyst (hereafter, the conversion is called a "conversion of hydrocarbons" in this specification) have been widely employed for the production of an oxo synthesis gas, an ammonia synthesis gas and various other synthesis gases.

The conversion of hydrocarbons is ordinarily conducted at temperatures of 350°–950°C., which varies depending upon the kind of synthesis gas desired, using a catalyst mainly consisting of nickel and a heat-resistant carrier. The most serious problem encountered in carrying out the conversion of hydrocarbons on an industrial scale is the deposition of carbon materials on the catalyst. Such carbon deposition causes deterioration of the catalyst and coking, and leads to serious operational problems in that catalyst activity is reduced and that clogging of catalyst layer and the process equipment occurs.

The tendency for carbon deposition to occur increases as the boiling points of raw hydrocarbons in the feed increase and as the content of unsaturated compounds in the raw hydrocarbons increases. The problem of preventing carbon deposition has become more serious recently due to the changes in the source of raw hydrocarbons, i.e., the change of naphtha to heavy fractions or the utilization of $C_4$-fractions.

The deposition of carbon may be prevented by using a large amount of steam or carbon dioxide, that is, by increasing the ratio of steam or carbon dioxide to hydrocarbons (the ratio is usually expressed as a molar ratio per carbon atom of the hydrocarbons, i.e., $H_2O/C$ and $CO_2/C$), but such a method is undesirable from an economical viewpoint.

SUMMARY OF THE INVENTION

This invention has as its aim overcoming the problem of the deposition of carbon in the conversion of hydrocarbons by improving the catalyst.

One object of this invention is, therefore, to provide an improved nickel-type catalyst useful for the conversion of hydrocarbons.

Another object of this invention is to provide an industrially advantageous process for the conversion of hydrocarbons in the presence of such an improved catalyst.

The objects of this invention are attained by cracking hydrocarbons with steam and/or carbon dioxide in the presence of a catalyst comprised of nickel, at least one of vanadium and molybdenum, and a heat-resistant carrier according to the present invention.

Figure 1:
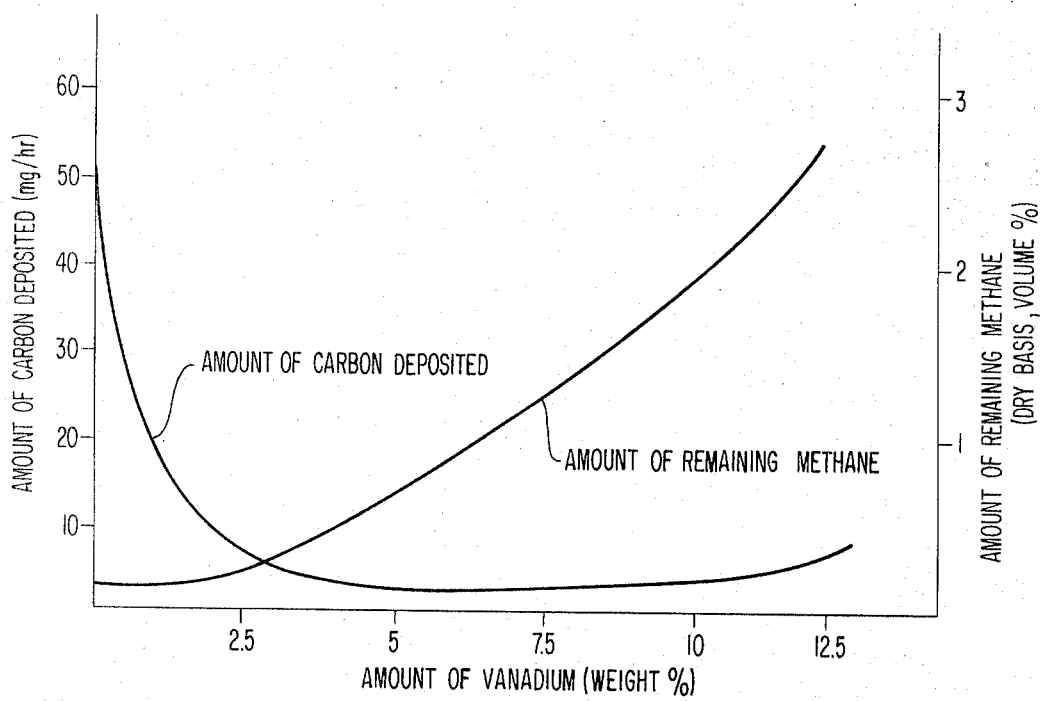
FIGS. 1 and 2 show the relationship between the amount of carbon deposited and the amount of methane remaining by conducting the conversion of light naphtha versus the amount of vanadium and/or molybdenum in the catalyst.

In the figures, the horizontal axis shows the amount of vanadium and/or molybdenum (weight percent), the left vertical axis shows the amount of carbon deposited (mg/hr) and the right vertical axis shows the amount of methane remaining (volume percent, based on dryness).

DETAILED DESCRIPTION OF THE INVENTION

A catalyst for the conversion of hydrocarbons is generally prepared by blending nickel as a main component (or cobalt in some cases) with a heat resistant carrier as is generally used in the catalytic arts, e.g., a metal oxide such as alumina, magnesia, calcium oxide, zirconium oxide, silica, etc., or a refractory carrier such as a clay comprised of the aforesaid heat resistant metal oxide(s), diatomaceous earth or calcined products thereof such as Portland cement and alumina cement.

According to the present invention, the deposition of carbon during the conversion of hydrocarbons is controlled or suppressed by such a nickel base catalyst further containing a vanadium component and/or a molybdenum component.

Any vanadium containing compound(s) and/or molybdenum containing compound(s) can be used as the additive component(s) to the nickel-base catalyst for suppressing the deposition of carbon in accordance with this invention. Specific examples of the vanadium compound include oxides such as vanadium pentoxide and vanadium trioxide; oxy-halogenides such as vanadyl dichloride; halogenides such as vanadium chloride; and vanadates such as ammonium divanadate. Specific examples of the molybdenum compound include oxides such as molybdenum trioxide; halogenides such as molybdenum chloride; oxy-halogenides such as molybdenum oxychloride; and molybdates such as ammonium molybdate.

The vanadium component and/or the molybdenum component can be added to the catalyst composition in any manner, e.g., the compound or compounds can be added to a catalyst composition comprised of nickel and a heat resistant carrier by an immersion method in which the catalyst composition is immersed in a solution of a soluble compound of vanadium or molybdenum, or each compound can be added by a mechanical mixing method, that is, by mixing the catalyst composition comprised of the nickel component and the heat resistant carrier with a vanadium compound or a molybdenum compound and calcining the mixture thus obtained. As mixing methods of adding the additive to the catalyst composition, there is a wet method wherein the vanadium compound or the molybdenum compound is mixed with a nickel compound and/or the heat resistant carrier in the wet cake state and a dry method wherein the vanadium compound or the molybdenum compound is mixed with a nickel compound and/or the heat resistant carrier while all components are dry. Any mixing method mentioned above can be effectively used to form the catalysts of this invention. For example, in the process of preparing the catalyst composition by impregnating a carrier with a solution of a nickel salt and then mixing, drying, calcining, molding and calcining the mixture in a manner known to the art, the vanadium compound or the molybdenum compound can be preliminarily added to the solution of the nickel salt as a solution thereof before impregnating the carrier with the solution of the nickel salt, or the vanadium compound or the molybdenum compound can be preliminarily added to the carrier by dry mixing, or the vanadium compound or the molybdenum compound can be mixed with a mixture of a solution of the nickel salt and the carrier in the cake state using a wet system.

Furthermore, by incorporating the vanadium compound or the molybdenum compound in a commercially available nickel conversion catalyst, the resultant catalyst will effectively suppress the deposition of carbon. In other words, the addition of the aforesaid compound as an additive for suppressing the deposition of carbon can be practiced in any stage of preparing a conversion catalyst comprised of nickel and a heat resistant carrier and can be performed in any manner.

Moreover, the vanadium compound can be added to the catalyst composition together with the molybdenum compound.

It is known, for controlling the deposition of carbon, to add an alkali compound such as a potassium compound to a catalyst as an additive. The action of the alkali is believed to alleviate the tendency of an acid carrier such as alumina to increase the deposition of carbon and at the same time to promote the reaction $C + H_2O \rightarrow CO + H_2$, whereby carbon deposited is removed.

On the other hand, it has been confirmed that the catalyst of this invention contains a vanadium component and/or a molybdenum component, combined with nickel to form a compound of nickel and vanadium and/or a compound of nickel and molybdenum in the catalyst, and thus it is considered that the addition of such component or components controls the activity of nickel in the conversion reaction system to restrain the deposition of carbon.

The amount of nickel in the catalyst of this invention is usually 2–55 percent by weight as NiO, preferably 5–40 percent, based on the total weight of the catalyst.

In general, the amount of nickel is preferably 5–30 percent in the case of producing a synthesis gas but in the case of producing a town gas the amount of nickel is larger than that for the case of a synthesis gas.

With respect to the amount of the vanadium compound or the molybdenum compound, as the addition amount thereof increases the effect of suppressing the deposition of carbon increases, but if the amount is too large the suppressing effect tends to decrease. Further, if the amount of the additive is too large, the activity of the catalyst decreases, that is, in the case of producing a synthesis gas mainly consisting of hydrogen and carbon monoxide at high temperature that amount of methane in the synthesis gas tends to increase over the theoretically balanced amount of methane. Thus, a suitable amount of the additive must be selected considering both the aspect of the suppression effect of the deposition of carbon and the activity of the catalyst.

In general, the amount of vanadium and/or molybdenum is 0.2–14 percent by weight based upon the total weight of the catalyst, however, the preferred amount of vanadium is 0.7–10 percent by weight and the preferred amount of molybdenum is 0.7–11 percent by weight, respectively, based upon the total weight of the catalyst.

The above-mentioned amounts of the additives mean that the molar ratio of vanadium and/or molybdenum to nickel, V and/or Mo:Ni is in a range of 0.01–0.9, preferably 0.04–0.7.

Figure 2:
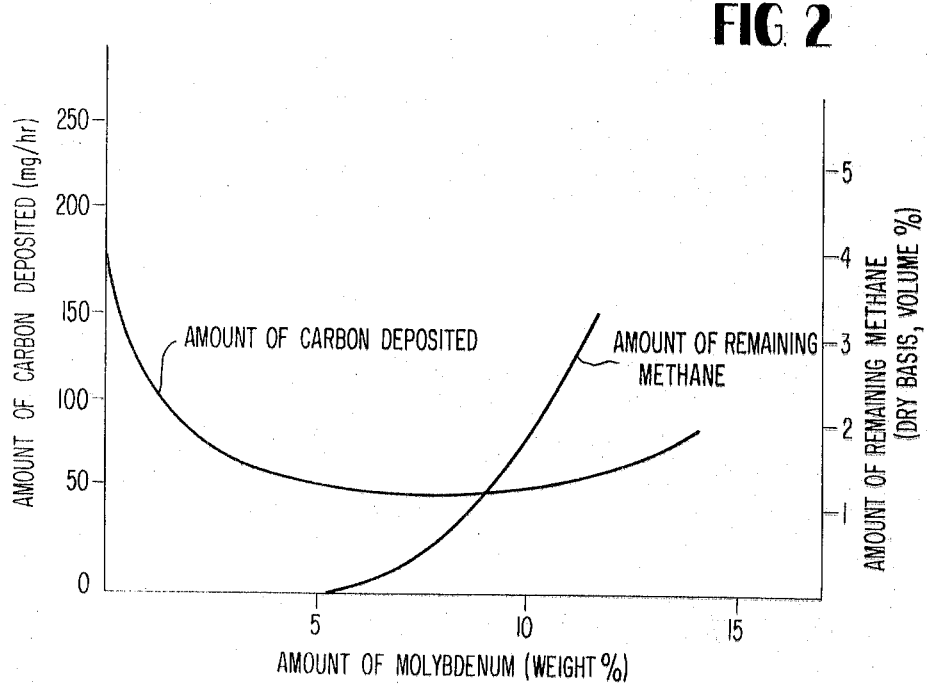

These facts are clearly shown in FIG. 1 and FIG. 2 of the accompanying drawings, which show the relationship between the amount of vanadium or molybdenum and the amount of carbon deposited and the amount of methane remaining.

In the figures, the horizontal axis shows the amount of vanadium and/or molybdenum (weight percent), the left vertical axis shows the amount of carbon deposited (mg/hr.) and the right vertical axis shows the amount of methane remaining (volume percent, based on dryness).

Specifically FIG. 1 is a graph showing the results obtained by conducting the conversion of hydrocarbons under the following operation conditions:

Raw material naphtha : desulfurized light naphtha
Saturated hydrocarbons (paraffins + naphthenes)
| | 95.85% by | volume |
|---|---|---|
| Aromatic hydrocarbons | 3.84 | do. |
| Olefinic hydrocarbons | 0.31 | do. |
| Mean molecular formula | $C_{7.0}H_{15.4}$ | |
| Sulfur content | 0.5 ppm. | |
| Specific gravity $d_{14}^{15}$ | 0.6995 | |

Initial boiling point 36.0°C. —
final boiling point 141.0°C.
Liquid space velocity of naphtha LHSV = 1.6

Reaction temperature 800°C.; Reaction pressure normal pressure; $H_2O/C = 1.5$ (conversion by steam)

The catalyst used in this reaction was composed of 20 percent by weight NiO as the nickel component, an alumina carrier and a definite amount of vanadium as shown in FIG. 1.

The operation conditions for obtaining the results shown in FIG. 2 were as follows:

Raw material naphtha : light naphtha
Saturated hydrocarbons (paraffins + naphthenes)
| | 98.9% by | volume |
|---|---|---|
| Aromatic hydrocarbons | 0.7 | do. |
| Olefinic hydrocarbons | 0.4 | do. |
| Mean molecular formula | $C_{6.0}H_{14.0}$ | |
| Sulfur content | 140 ppm. | |
| Specific gravity $d_4^{15}$ | 0.6632 | |

Initial boiling point 35°C. —
final boiling point 108°C.
Liquid space velocity of naphtha LHSV = 0.29

Reaction temperature 850°C; Reaction pressure normal pressure; $H_2O/C = 3.0$ (conversion by steam).

The catalyst used in this reaction was composed of 13 percent by weight NiO as the nickel component, an alumina carrier and a definite amount of molybdenum as shown in FIG. 2.

The process of this invention can be used to produce a synthesis gas consisting mainly of hydrogen and carbon monoxide, such as an ammonia synthesis gas or an oxo synthesis gas and also a methane-rich gas such as a town gas. Though the reaction temperature can be varied depending upon the kind of product gas desired, generally it is from about 300° to about 1,000°C. The reaction temperature can be varied depending upon the kind of product gas desired, but the reaction temperature is about 350° to about 600°C, in the case of producing a methane rich gas, and about 600° to about 950°C. in the case of producing a synthesis gas mainly consisting of hydrogen and carbon monoxide. The reaction pressure in the process of this invention is, in any case, in a range of from about normal pressure to about 50 kg./cm².

As will be known to one skilled in the art, the amount of hydrogen and carbon monoxide in a synthesis gas varies with its utility. For example, the ratio of hydrogen to carbon monoxide is about 1:1 for an oxo synthesis reaction while on the other hand a higher amount of hydrogen than carbon monoxide is preferred for an ammonia synthesis. For most uses, the hydrogen: carbon monoxide ratio is about 1:1 to about 3:1.

As the hydrocarbons used as the raw material or feed in the process of this invention, various types of hydrocarbons from methane to high molecular weight hydrocarbons shch as $C_{2+12}$ paraffins, e.g., propane, butane, hexane, heptane, octane, decane, etc., and aromatic hydrocarbons may be employed, and they can be used in the form of pure hydrocarbons or they can be off gases from a naphtha cracking furnace; petroleum fractions such as B—B fractions, petroleum naphtha, kerosene and light oil fractions; a coke oven gas, or natural gases. It is, as a matter of course, preferred that the content of sulfur in the raw material be as low as possible, but the addition of the vanadium compound and/or the molybdenum compound effectively suppresses the deposition of carbon for raw materials containing any amount of sulfur.

The LHSV of these hydrocarbons as raw materials is 0.1–1.0, preferably 0.2–5. The ratio of these hydrocarbons to steam and/or carbon dioxide is 1.0–10, perferably 1.0–7.

In short, when the conversion of hydrocarbons is conducted using the catalyst of this invention the conversion reaction can be conducted without being accompanied by serious deposition of carbon and with high catalyst activity even at operation with far lower $H_2O/C$ ratios or $CO_2/C$ ratios than in the case of using conventional conversion catalysts.

The process of this invention will now further be illustrated in detail by the following examples. However, the invention shall not be construed as limited to the examples in any way. In addition, to facilitate an understanding of our invention, examples of preparing the catalysts and examples of conducting the conversion reaction of hydrocarbons are explained separately.

Examples of preparing catalyst (Examples 1–5):

Example 1

Into a mixture of an aqueous solution of 77.3 g./20 ml. of nickel nitrate and an aqueous solution of 12.3 g./20 ml. of ammonium molybdate ( $(NH_4)_6Mo_7O_{24}·4H_2O$) was immersed 70 g. of γ-alumina, and after evaporating away water while agitating well, the mixture was dried for 24 hours at 120°C. and calcined for 5 hours at 600°C. in a nitrogen gas stream. The product was pulverized in a mortar and molded by means of a cylindrical pellet molding machine into pellets having a diameter of 3 mm. and a height of 3 mm. The molded product was further calcined for 6 hours at 800°C. in a nitrogen stream to provide a catalyst for the conversion of hydrocarbons. The catalyst thus prepared has the theoretical chemical composition: 20 percent by weight NiO, 70 percent by weight $Al_2O_3$, and 10 percent by weight of $MoO_3$ ( 6.7 percent by weight Mo), and in this case the Mo/Ni ratio was 0.26 (mole ratio). Furthermore, it was confirmed by an X-ray diffraction analysis that Mo formed a stable compound of Mo and Ni by a solid phase reaction with Ni.

Example 2

A commercially available conversion catalyst (carrier: kaolin; chemical composition: 13% NiO, 42% $Al_2O_3$, and 40% $SiO_2$) was pulverized to an 8–12 mesh size and 30 g. samples of the pulverized catalyst were immersed in aqueous solutions of ammonium molybdate at a concentration such that the catalyst produced contained 0.56 g., 1.42 g., 2.91 g. or 6.15 g. of ammonium molybdate. Each sample was dried for 24 hours at 115°C., calcined for 5 hours at 600°C. in a nitrogen gas stream and further calcined for 6 hours at 800°C. in a nitrogen gas stream to provide a conversion catalyst of this invention. The catalysts thus prepared contained 1 percent by weight, 2.5 percent by weight, 5 percent by weight and 10 percent by weight Mo, respectively. In this case, the Mo/Ni ratios of the catalysts were 0.06, 0.15, 0.30 and 0.60, respectively (mole ratio).

EXAMPLE 3

Into a mixture of an aqueous solution of 7.8 g./20 ml. of nickel nitrate and an aqueous solution of 7.58 g./10 ml. of vanadyl dichloride ($VOCl_2$) was immersed 70 g. of γ-alumina, and after mixing well and evaporating water off the mixture was dried for 24 hours at 120°C. and calcined for 5 hours at 600°C. in a nitrogen gas stream. The product was pulverized, molded into cylindrical pellets having a diameter of 3 mm. and a height of 3 mm. by means of a pellet molding machine, and then further calcined for 6 hours at 800°C. in a nitrogen gas stream to provide a catalyst of this invention. The catalyst had the theoretical chemical composition of 20 percent by weight NiO, 70 percent by weight $Al_2O_3$ and 5.6 percent by weight V. The V/Ni ratio of the catalyst was 0.41 (mole ratio).

EXAMPLE 4

The same procedure as in Example 3 was followed using an aqueous solution of 6.43 g./10 ml. of ammonium metavanadate ($NH_4VO_3$) in place of the aqueous solution of vanadyl dichloride and a catalyst of this invention containing 5.6 percent by weight V was prepared. The V/Ni mole ratio of the catalyst was 0.41.

EXAMPLE 5

Conversion catalysts each containing a definite amount of vanadium pentoxide powder were prepared. That is, 1 g., 5 g., 10 g. or 20 g. of vanadium pentoxide was mixed well with 79 g., 75 g., 70 g., or 60 g. of γ-alumina, respectively, to provide 80 g. of each mixture. Each of the mixtures was immersed in an aqueous solution of 77.8 g./20 ml. of nickel sulfate and then processed as in Example 4 to provide 4 catalysts containing 1 percent by weight, 5 percent by weight, 10 percent by weight or 20 percent by weight $V_2O_5$ (0.56, 2.8, 5.6 and 11.2 percent by weight V), respectively. In this case, the vanadium content in the catalyst was, as V/Ni mole ratio, 0.04, 0.21, 0.41 and 0.82, respectively.

Examples of conversion reaction (Examples 6-9):

EXAMPLE 6

The steam conversion of naphtha was conducted under the following conditions using the catalyst prepared in Example 1.

Raw material naphtha : light desulfurized naphtha
Saturated hydrocarbons (paraffins + naphthenes)
                                  95.89% by volume
Aromatic hydrocarbons             3.84      do.
Olefinic hydrocarbons             0.31      do.
Mean molecular formula            $C_7H_{15}$
Specific gravity $d_4^{15}$       0.6995
sulfur content                    0.5 ppm.
Initial boiling point 36.0°C. —
                    final boiling point 141.0°C.

Reaction temperature 800°C.; Reaction pressure normal pressure; liquid space velocity of naphtha LHSV = 1.6; $H_2O/C$ = 1.5.

The run was conducted as follows: A definite amount of naphtha was placed in an evaporator by means of a micro-feeder and evaporated and then steam was added to the vapor so that the $H_2O/C$ ratio was 1.5 (mole ratio). After preheating the gas mixture thus obtained, the mixture was reacted by contacting with 6.25 ml. of the catalyst in a quartz reactor and the gas product from the catalyst bed was passed through water and analyzed by means of gas chromatography.

An analysis of carbon deposited during the reaction was conducted as follows: after the reaction, air or oxygen was introduced into the reactor to oxidize any carbon present into CO and $CO_2$, and the gaseous product of oxidation was passed through a heated copper catalyst layer to convert CO in the gas into $CO_2$. The content of carbon dioxide was then measured in quantatively, whereby the amount of carbon deposited in the reaction system or the reactor was determined. The results are shown in Table 1.

Table 1

| Catalyst | Amount of C deposited (mg/hr.) | Remaining methane (dry base) | Note |
|---|---|---|---|
| $NiO-Al_2O_3$ | 55.2 | 0.2 | comparison example |
|  | 52.7 | 0.2 |  |
| $NiO-Al_2O_3-MoO_3$ | 11.4 | 0.2 |  |
|  | 10.4 | 0.2 |  |

EXAMPLE 7

The conversion of naphtha was conducted under the following conditions using the four catalysts prepared in Example 2.

Raw material naphtha : non-sulfurized naphtha
Saturated hydrocarbons (paraffins + naphthenes)
                                  98.9% by volume
Aromatic hydrocarbons             0.7       do.
Olefinic hydrocarbons             0.4       do.
Mean molecular formala            $C_6H_{14}$
Specific gravity $d_4^{15}$       0.6632
Sulfur content                    140 ppm.
Initial boiling point 35°C. —
                    final boiling point 108°C.

Reaction temperature 850°C.; Reaction pressure normal pressure; Liquid space velocity of naphtha LHSV = 0.29; $H_2O/C$ = 3.0.

The results are shown in Table 2.

Table 2

| Mo content (wt.%) | Amount of C deposited (mg/hr.) | Composition of gas produced (vol%) | | | | | Note |
|---|---|---|---|---|---|---|---|
| | | $H_2$ | CO | $CO_2$ | $CH_4$ | $C_2H_4$ | |
| 0 | 208.0 | 73.7 | 15.8 | 9.5 | 0 | 0 | comparison example using commercially available catalyst |
| 0 | 186.6 | 72.9 | 17.6 | 9.5 | 0 | 0 | |
| 1.0 | 112.0 | 72.7 | 17.0 | 10.3 | 0 | 0 | |
| 2.5 | 76.7 | 72.7 | 17.2 | 9.0 | 0 | 0 | |
| 2.5 | 64.9 | 72.6 | 16.5 | 10.9 | 0 | 0 | |
| 5.0 | 48.9 | 72.8 | 16.6 | 9.5 | 0 | 0 | |
| do. | 48.7 | 73.4 | 15.8 | 10.7 | 0.03 | 0 | |
| do. | 51.3 | 73.2 | 17.2 | 9.5 | 0.03 | 0 | |
| 10.0 | 51.3 | 71.4 | 17.6 | 9.3 | 1.7 | 0 | |
| do. | 50.3 | 70.9 | 16.8 | 10.4 | 1.9 | trace | |

EXAMPLE 8

The same procedure as was used in Example 6 was followed using the three catalysts containing 5.6 percent by weight V prepared in Example 3, Example 4 and Example 5. The results are shown in the following table.

Table 3

| Manner of adding vanadium | V-content (wt%) | C-amount deposited (mg/hr.) | Remaining Methane content (vol%) in gas produced (dry basis) |
|---|---|---|---|
| $VOCl_2$ solution | 5.6 | 4.0 | 0.5 |
|  |  | 3.5 | 1.0 |
| $NH_4VO_3$ solution | 5.6 | 2.1 | 2.3 |
|  |  | 2.9 | 2.2 |
| $V_2O_5$ powder | 5.6 | 1.1 | 1.3 |
|  |  | 3.4 | 1.2 |
| none (control example) | — | 55.2 | 0.2 |
|  |  | 52.7 | 0.2 |

From the above results, it can be seen that the effect of suppressing the deposition of carbon was remarkable in any case where vanadium was added in any manner.

EXAMPLE 9

The same procedure as was used in Example 6 was followed except for using catalysts containing different amounts of $V_2O_5$ as prepared in Example 5. The results are shown in the following table.

Table 4

| V-content (wt.%) | Amount of C deposited (mg/hr.) | Remaining Methane content (vol.%) in the gas produced |
|---|---|---|
| 0.56 | 15.9 | 0.2 |
| 2.8 | 11.2 | 0.2 |
| 5.6 | 3.4 | 1.2 |
| 11.2 | 4.5 | 2.3 |
| none | 55.2 | 0.2 (comparison example) |

In the above examples, the conversion reactions were conducted using steam, but the present invention can be effectively applied to the case of conducting the conversion reaction of hydrocarbons using carbon dioxide or a mixture of carbon dioxide and steam. Examples of conducting the conversion reaction of hydrocarbons using steam and carbon dioxide are shown in the following examples (Examples 10 and 11).

EXAMPLE 10

Preparation of catalyst:

A commercially available conversion catalyst having the chemical composition 21% NiO, 64% $Al_2O_3$, and 4% CaO was pulverized into an 8–12 mesh size and a 30 g. sample of the pulverized catalyst was immersed in an aqueous solution of ammonium molybdate so that the catalyst contained 2.91 g. of ammonium molybdate. After drying for 24 hours at 115°C., the mixture was calcined for 5 hours at 600°C. in a nitrogen gas stream and then further calcined for 6 hours at 800°C. in a nitrogen gas stream to provide a catalyst containing 5 percent by weight Mo.

Conversion reaction:

Using the catalyst thus prepared, the conversion reaction of n-butane with steam and carbon dioxide was conducted and, as a comparison example, the same reaction was conducted under the same conditions as above using the commercially available catalyst as it was. The reaction conditions and the results are as follows, the results showing that the addition of molybdenum effectively controls the deposition of carbon.

Reaction conditions:

| Raw material | n-butane |
|---|---|
| Reaction temperature | 800°C. |
| Reaction pressure | normal pressure |
| Space velocity of n-butane gas | 100/hr. |
| Amount of catalyst | 25 ml. |

Table 5

| Catalyst | $H_2O/C$ | $CO_2/C$ | Amount of C deposited (mg/hr.) | Remaining Methane content in gas produced (dry basis) |
|---|---|---|---|---|
| Commercially available catalyst (comparison example) | 0.75 | 1.0 | 54.1 | 0.4 |
| | 1.0 | 1.25 | 44.4 | 0.3 |
| | 1.5 | 1.75 | 27.0 | trace |
| | 2.0 | 2.30 | 28.7 | 0 |
| Catalyst containing 5% by weight Mo | 0.75 | 1.0 | 41.2 | 0.3 |
| | 1.0 | 1.25 | 23.9 | 0.3 |
| | 1.5 | 1.75 | 18.8 | trace |
| | 2.0 | 2.30 | 5.6 | 0 |

The amount of carbon deposited was the amount of carbon deposited after one hour of reaction.

EXAMPLE 11

Preparation of catalyst:

The same catalyst preparation procedure as in Example 10 was followed using the same commercially available catalyst as in the Example 10 except that 2.040 g. of ammonium metavanadate was used in place of ammonium molybdate. The catalyst contained 2.8 percent by weight vanadium.

Conversion reaction:

The conversion reaction of methane was conducted under the following conditions using the catalyst thus prepared and, for the sake of comparison, the same procedure was followed using the commercially available catalyst as it was. The results are shown in Table 6.

Reaction condition:

| Raw material | methane |
|---|---|
| Reaction temperature | 800°C. |
| Reaction pressure | 5 kg/cm.² gauge |
| Space velocity of methane gas | 400/hr. |
| Amount of catalyst | 25 ml. |

Table 6

| Catalyst | $H_2O/C$ | $CO_2/C$ | Amount of C deposited (mg/hr.) | Composition of product gas (dry basis, by volume) | | | |
|---|---|---|---|---|---|---|---|
| | | | | $H_2$ | CO | $CO_2$ | $CH_4$ |
| commercially available catalyst (comparison example) | 0.5 | 1.4 | 91.1 | 45.0 | 39.8 | 12.0 | 3.2 |
| | 1.0 | 1.9 | 29.5 | 40.4 | 39.4 | 19.1 | 1.1 |
| | 1.5 | 2.5 | 19.4 | 37.1 | 37.6 | 24.8 | 0.5 |
| | 2.0 | 3.0 | 13.0 | 36.9 | 33.6 | 28.7 | 0.8 |
| Catalyst containing 2.8% by weight V | 0.5 | 1.4 | 40.1 | 43.9 | 39.3 | 11.6 | 5.7 |
| | 1.0 | 1.9 | 20.3 | 40.6 | 38.4 | 19.2 | 1.8 |
| | 1.5 | 2.5 | 12.4 | 37.3 | 35.6 | 26.0 | 1.1 |
| | 2.0 | 3.0 | 10.2 | 36.2 | 35.0 | 27.7 | 1.1 |

The amount of carbon deposited was the amount of carbon deposited after one hour of reaction.

While the invention has been described in detail and with reference to specific embodiments thereof, it will be apparent to one skilled in the art that various changes and modifications can be made therein without departing from the spirit and scope thereof.

What is claimed is:

1. A process of producing a mixed gas which comprises cracking a hydrocarbon or hydrocarbons with at least one of steam and carbon dioxide in the presence of a catalyst consisting essentially of
   a. nickel,
   b. at least one of vanadium and molybdenum, and
   c. a heat resistant carrier.

2. The process of claim 1 where the mixed gas is a mixed gas containing hydrogen and carbon monoxide or a methane-rich gas.

3. The process of claim 2 where the catalyst contains Ni in an amount of 2 – 55 percent by weight as NiO.

4. The process of claim 2 where the catalyst contains at least one of vanadium and molybdenum at a mole ratio to nickel of 0.01 – 0.9.

5. The process of claim 2 where the methane-rich gas is produced by conducting the cracking reaction at a temperature of about 350° – 600°C. and under a pressure of from normal pressure to 50 Kg/cm².

6. The process of claim 2 where the mixed gas containing hydrogen and carbon monoxide is produced by conducting the cracking reaction at a temperature of about 600° – 950°C. and under a pressure of from normal pressure to 50 Kg/cm².

7. A process of producing a mixed gas as in claim 1 which comprises cracking a hydrocarbon or hydrocarbons with at least one of steam and carbon dioxide in the presence of a catalyst consisting essentially of
   a. nickel in an amount of 5 – 40 percent by weight as NiO,
   b. at least one of vanadium and molybdenum at a mole ratio to nickel of 0.04 – 0.7, and
   c. a heat resistant carrier.

8. The process of claim 7 where the mixed gas is a mixed gas containing hydrogen and carbon monoxide or a methane-rich gas.

9. A catalyst suitable for the cracking of hydrocarbons consisting essentially of:
   a. nickel in an amount of 2 – 55 percent by weight as NiO,
   b. at least one of vanadium and molybdenum at a mole ratio to nickel of 0.01 – 0.9, and
   c. a heat resistant carrier.

10. The process of claim 1 wherein the catalyst contains vanadium but not molybdenum.

11. The process of claim 1 wherein the catalyst contains molybdenum but not vanadium.

12. The process of claim 1 wherein the catalyst contains both vanadium and molybdenum.

13. The process of claim 1 wherein in the catalyst at least one of vanadium and molybdenum are combined with nickel to form a compound of nickel.

14. The process of claim 1 wherein the active catalytic components of the catalyst consist essentially of said nickel (a) and at least one of vanadium and molybdenum (b).

15. The process of claim 1 wherein said heat resistant carrier is a metal oxide selected from the group consisting of alumina, magnesia, calcium oxide, zirconium oxide and silica.

16. The process of claim 1 wherein said heat resistant carrier is a refractory carrier selected from the group consisting of:
   a clay comprising a metal oxide selected from the group consisting of alumina, magnesia, calcium oxide, zirconium oxide and silica;
   diatomaceous earth;
   Portland cement; and
   alumina cement.

17. The process of claim 1 wherein said catalyst comprises from 0.2 to 14 percent by weight of the catalyst of vanadium and/or molybdenum.

18. The process of claim 1 wherein said catalyst comprises from 0.7 to 10 percent by weight of the catalyst of vanadium.

19. The process of claim 1 wherein said catalyst comprises from 0.7 to 11 percent by weight of the catalyst of molybdenum.

20. The catalyst of claim 9 wherein the catalyst contains vanadium but not molybdenum.

21. The catalyst of claim 9 wherein the catalyst contains molybdenum but not vanadium.

22. The catalyst of claim 9 wherein the catalyst contains both vanadium and molybdenum.

23. The catalyst of claim 9 wherein in the catalyst at least one of vanadium and molybdenum are combined with nickel to form a compound of nickel.

24. The catalyst of claim 9 wherein the active catalyst components of the catalyst consist essentially of said nickel (a) and at least one of vanadium and molybdenum (b).

25. The catalyst of claim 9 wherein said heat resistant carrier is a metal oxide selected from the group consisting of alumina, magnesia, calcium oxide, zirconium oxide and silica.

26. The catalyst of claim 9 wherein said heat resistant carrier is a refractory carrier selected from the group consisting of:
  a clay comprising a metal oxide selected from the group consisting of alumina, magnesia, calcium oxide, zirconium oxide and silica; diatomaceous earth; Portland cement; and alumina cement.

27. The catalyst of claim 9 wherein said catalyst comprises from 0.2 to 14 percent by weight of the catalyst of vanadium and/or molybdenum.

28. The catalyst of claim 9 wherein said catalyst comprises from 0.7 to 10 percent by weight of the catalyst of vanadium.

29. The catalyst of claim 9 wherein said catalyst comprises from 0.7 to 11 percent by weight of the catalyst of molybdenum.

* * * * *